United States Patent [19]

Haghiri et al.

[11] Patent Number: 4,963,965
[45] Date of Patent: Oct. 16, 1990

[54] METHOD OF AND ARRANGEMENT FOR CONVERTING THE TEMPORAL RATE OF HIGH DEFINITION TELEVISION PICTURES AND TELEVISION PICTURE DECODER COMPRISING SUCH AN ARRANGEMENT

[75] Inventors: Mohammad-Réza Haghiri, Sceaux; Philippe Guichard, Verrieres-le-Buisson, both of France

[73] Assignee: U.S. Philips Corporation, New York, N.Y.

[21] Appl. No.: 423,173

[22] Filed: Oct. 18, 1989

[30] Foreign Application Priority Data

Oct. 21, 1988 [FR] France ................. 88 13809

[51] Int. Cl.⁵ ........................... H04N 7/01
[52] U.S. Cl. ..................... 358/140; 358/105
[58] Field of Search ............ 358/140, 105, 11, 133

[56] References Cited

U.S. PATENT DOCUMENTS 4,668,974 5/1987 Kita ............................ 358/11
4,908,697 3/1990 Tsinberg ..................... 358/133

Primary Examiner—Howard W Britton
Attorney, Agent, or Firm—Michael E. Marion

[57] ABSTRACT

Method of and arrangement for converting the temporal rate of high definition television pictures, in accordance with which, after the division by two of the line period in a line period changing circuit (100) and storing the fields of the picture for a working period corresponding to one period with the aid of field memories (90, 80, 70, 311), these fields are processed in parallel by simple field repetition, by taking a motion compensated half-sum and by filtering and, by the selection of one of the three field sequences thus processed e.g. with the aid of digital assistance signals provided in the HD-MAC high definition television standard. This method and device can be used in high definition television receivers.

8 Claims, 4 Drawing Sheets

FIG. 2

|       | I₄ | I₃ | I₂ | I₁ |    |    |
|-------|----|----|----|----|----|-----|
| 0     | B  | B  | A  | (A)|    |    |
| 10 ms | C  | B  | (B)| A  | A  |    |
| 20 ms | C  | C  | B  | B  | A  | (A)|
| 30 ms | D  | C  | C  | B  | (B)| A  |
| 40 ms | D  | D  | C  | (C)| B  | B  |
| 50 ms | E  | D  | (D)| C  | C  | B  |

FIG. 3

|       |    | I₄ | I₃ | I₂ | I₁ |
|-------|----|----|----|----|----|
| 0     | B  | B  | A  | (A)|    |
| 10 ms | C  | B  | (B)| A  | (A)|
| 20 ms | C  | C  | B  | (B)| A  | A |
| 30 ms | D  | C  | (C)| B  | (B)| A |
| 40 ms | D  | D  | C  | (C)| B  | B |
| 50 ms | E  | D  | (D)| C  | (C)| B |

|  | $I_2$ | $I_1$ |
|---|---|---|
| 0 | 0 | 0 |
| 10 ms | A | 0 |
| 20 ms | A | Ⓐ |
| 30 ms | B,A | A |
| 40 ms | B,B | B |
| 50 ms | C | Ⓑ |
| 60 ms | C | Ⓒ |
| 70 ms | D,C | C |
| 80 ms | D,D | D |

FIG. 4a

|  | $I_3$ | $I_2$ | $I_1$ | $I_0$ |
|---|---|---|---|---|
|  | 0 | 0 | 0 | 0 |
|  | A | 0 | 0 | 0 |
|  | A | A | 0 | 0 |
|  | B | A | Ⓐ | 0 |
|  | Ⓑ | B,2A | A | A |
|  | C | B,2B | B | Ⓐ |
|  | C | C | Ⓑ | B |
|  | D | C | Ⓒ | B |
|  | Ⓓ | D,2C | C | C |

FIG. 4b

METHOD OF AND ARRANGEMENT FOR CONVERTING THE TEMPORAL RATE OF HIGH DEFINITION TELEVISION PICTURES AND TELEVISION PICTURE DECODER COMPRISING SUCH AN ARRANGEMENT

BACKGROUND OF THE INVENTION

The present invention relates to a method of and an arrangement for converting the temporal rate of high definition television pictures, as well as to a television picture decoder comprising such an arrangement.

There is no escape from the fact that future television programmer will very soon be filmed with a high definition. The D2 MAC/Packets standard which is the result of years of European effort improves the quality of television pictures to a considerable extent by obviating the inherent disadvantage of the frequency-division multiPlexing used in the SECAM standard, which is based on a fixed constant, e.g. a number of lines equal to 625, which precludes obtaining a picture resolution of high quality. The object of high definition television systems is to, horizontally and vertically, a spatial resolution which is substantially twice as good as the resolution provided by the D2 MAC/Packets standard while still using the analog channel provided in the MAC standard which has a capacity is limited to one quartz of the amount of information available in these high definition Pictures.

Encoders, used on transmission, and decoders, used on reception, have therefore been adapted to this high definition data volume on be transmitted to the available channel. The basic principle is to use a spatial-temporal decimation, which renders it possible to remove three signal samples out of four before transmission. It is a known fact that in a filmed scene, the sensitivity of the eye to spatial resolution decreases as the speed of motion increases, and vice versa. The spatial-temporal decimation is therefore accompanied, in accordance with the principle proposed, by an adaptation of said decimation intended to make the spectral contents three-dimensional in an as accurate manner as possible: to this end a modification of the type of signal sampling is made, depending on whether the processed picture zones (these pictures are divided into blocks) correspond to fixed picture portions, portions with little motion, or portions with much motion.

These principles are described in a detailed manner in the paper "HD-MAC coding of high definition television signals", F.W.P. Vzeeswijk, F. Fonsalas, T.I.P. Trew, C.C. Smith and M. Haghiri, presented during the exhibition IBC'88, Brighton (Great Britain), 23-27 Sep. 1988. Put more accurately, in accordance with the defined principle of utilizing three types of sub-sampling operations corresponding to three different transmission rates and usually designated in accordance with the duration of the corresponding refresh periods, which are here 80, 40 and 20 milliseconds, respectively, the picture, which is divided into blocks to ensure that the processing operations are adapted to the local content of the picture, is received in the encoder via three parallel-arranged branches each effecting one of the three sub-sampling operations in accordance with the range of motions. For each block, one of the three branches is chosen and the corresponding samples are conveyed for transmission in the analog form via the analog transmission channel used in the MAC standard, the decision of whether the 80, 40 and 20 ms branch is chosen being made by a decision circuit which is preceded by a circuit ;or estimating said motion. A digital assistance channel, of the Digitally Assisted TeleVision system ensures the transmission of the motion information components and the choice of the branch to the decoder arranged at the receiver end.

In a corresponding manner, this decoder comprises three branches which are also denoted by 80, 40 and 20 ms and which operate in a continuous and parallel manner. At each instant, thanks to the digital assistance data, the branch to be selected is known. Actually, since the three temporal rates defined in the foregoing are transmitted by timedivision multiplex with three different spatial-temPoral sampling operations, the current data can only feed the selected branch. After recovery of the data structures the output signals of the branch thus selected are supplied to constitute the high definition output of said decoder.

The referenced document also describes in detail the branch selection principle which is based on, for each block and for the three branches, a calculation of the distortion relative to the original picture and the selection, for transmission, of that one of the branches having the minimum distortion. This document also describes the motion estimating and compensating principle, providing the elimination of one field out of two fields before transmission, and the recovery of the missing fields, on reception, by using the existing temporal information between the two transmitted fields. This temporal information is most often simple translation information represented by a vector pointing in the direction of the motion. In a general way, the motion estimation and compensation thus effected make use of the redundancy of the temporal content of the picture sequences, by extracting before transmission auxiliary information components which are thereafter transmitted in parallel with the principal information components to enable the recovery of the pictures at the receiving end.

These various techniques result in pictures which are indeed of a high quality, but in which because of the 50 Hz field frequency, a jitter phenomenon may remain, more specifically on the picture zones of a very high brightness, which phenomenon is more perceptible on larger screen television set is larger, and consequently is very annoying to the eye.

SUMMARY OF THE INVENTION

It is an object of the invention to provide a television picture temporal rate conversion method suitable for eliminating such a jitter from the picture. To that effect, a method of converting the temporal rate of high definition television pictures, is characterized in thai, it comprises the following steps:
  (a) dividing the line periods of the sequence of original pictures by two;
  (b) storing the consecutive fields forming said pictures, for a working period corresponding to a period of the said pictures and at the rate corresponding to the temporal rate to be obtained after conversion;
  (c) parallel processing of said stored fields by simple field repetition, by taking a motion-compensated half sum, and by filtering;
  (d) selecting, in dependence on additional information components, one of the three field sequences thus processed. This selection is preferably effected by utilizing the digital assistance signals provided for in the HD-MAC standard.

A further object of the invention is to provide an arrangement for converting the temporal rate of high definition television pictures for putting this method into effect.

This arrangement is to that end characterized in that it comprises:

(a) a line period changing circuit for dividing by two the duration of lines of the sequence of pictures;

(b) arranged in series with said circuit, three field stores for each producing a delay equal to half the field period of the sequence of pictures, the output signals of said stores and said circuit being denoted by $I_1$, $I_2$, $I_3$, $I_4$;

(c) a first change-over switch being coupled to receive a control signal for operating at a frequency which is twice the frequency of sequence of pictures and being coupled to receive in parallel each of the signals $I_1$ to $I_4$ to supply sequentially, at its operating rate, the respective signals $I_3$, $I_4$, $I_1$, $I_2$;

(d) a series arrangement of an added for taking the halfsum of the signals $I_2$ and $I_4$, said adder having a third input for receiving a motion information component to compensate movement of one signal to the other, and a second change-over switch being coupled to receive a control signal for operating at a frequency which is twice the frequency of sequence o: pictures and further being coupled to receive in parallel said motion compensated half-sum and the signal $I_3$ to supply sequentially, at its operating rate, this half-sum or this signal $I_3$;

(e) a series arrangement of a filter and a third change-over switch being coupled to receive a control signal for operating at said frequency of double the frequency of the sequence of pictures, and further being coupled to receive in parallel the output signal of said filter and the signal $I_3$ to supply sequentially, at its operating rate, this output or this signal $I_3$.

With the structure thus proposed, the jitter in the very bright and high vertical frequency zones are eliminated. The adopted principle has furthermore the advantage that in the case of the HD-MAC standard, it is fully compatible with the described coding and decoding methods since it uses only the digital assistance data transmitted by the DATV channel.

BRIEF DESCRIPTION OF THE DRAWINGS

Particulars and advantages of the invention will become more apparent from the following description given by way of nonlimitative example with reference to the accompanying drawings, in which:

FIG. 2, 3, 4a and 4b are Tables which schematically illustrate the mode of employment of the original fields of the television signals for generating the signals corrected for any jitter;

DETAILED DESCRIPTION OF THE INVENTION

The principle o: the temporal rate conversion described here as an example basically consists in taking a sequence o: the original picture, at a frequency of 50 Hz, and to divide the duration of the lines forming these images by two in a first period of time. The consecutive fields forming said pictures are then stored for a working period corresponding to one period of these pictures, that is to say 40 ms in the present case, but at the rate corresponding to the temporal rate desired after conversion.

The fields thus stored are then processed in parallel in three processing channels, using a simple field repetition intended for the case of pictures in which there is very little motion, a motion compensated half-sum intended for the case of pictures with motion of medium importance and which consequently can be compensated, and by filtering intended for the case of pictures with considerable motion. Finally, only one out of three field sequences thus processed is selected to constitute the signals to be obtained at the new temporal rate after conversion. This selection is effected in accordance with the speed of the estimated motions of one picture to the next. In the case of the HD-MAC standard, this selection is effected by utilizing the digital assistance signals provided in the specifications of the standard.

Figure 1:
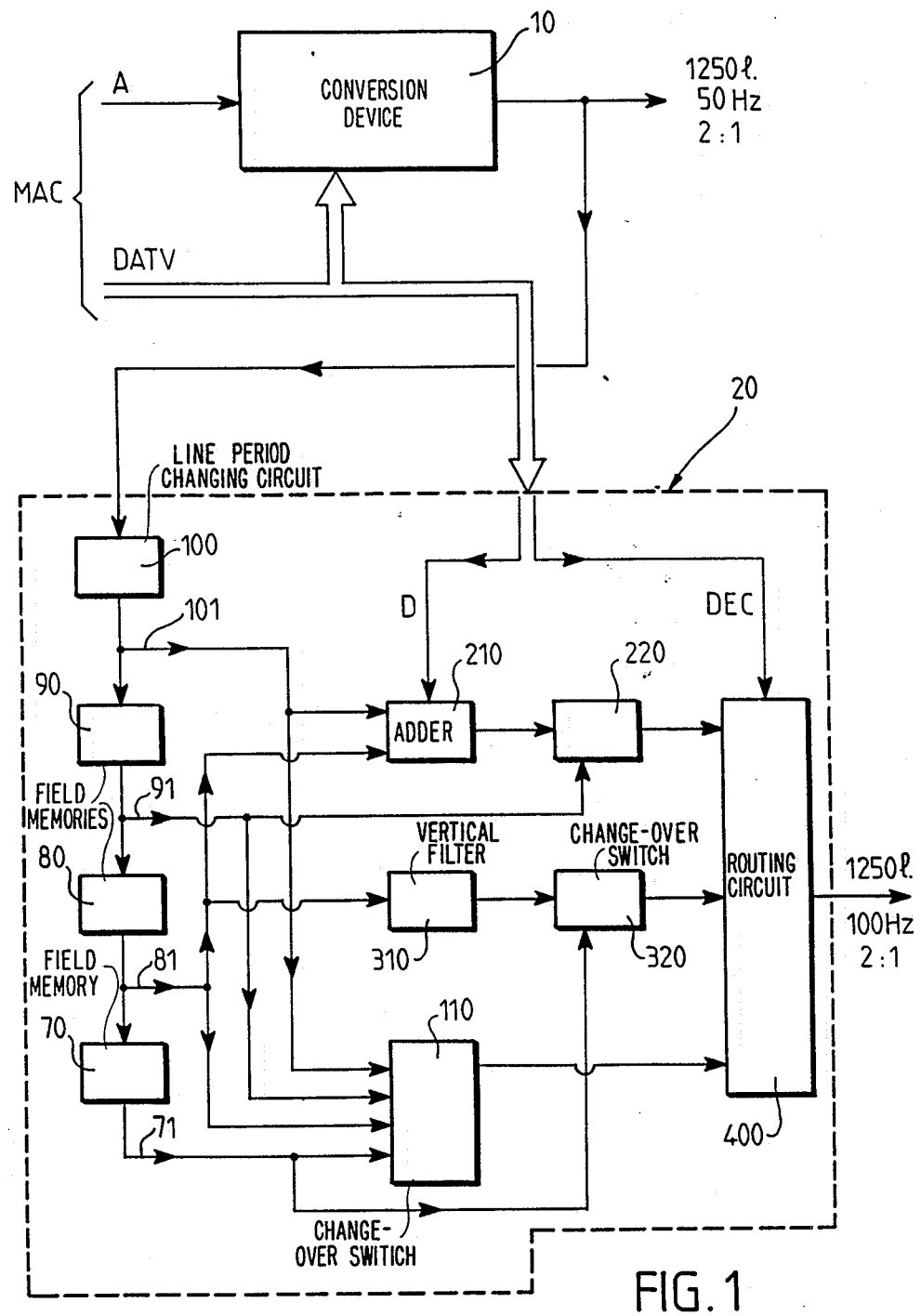
FIG. 1 shows an embodiment of the decoder including a temporal rate converter device in accordance with the invention.

FIG. 1 which shows a preferred embodiment of the decoder having an arrangement for converting the temporal rate by means of which the method according to the invention can be Put into effect, comprises a conversion device proper, denoted by reference numeral 10 and a temporal rate converter device, denoted by reference numeral 20. The decoder device 10 receives here digital video signals having 625 l., 50 Hz, 2:1, 720 p./l., line period = 64 microseconds, that is to say socalled compatible MAC pictures transmitted via the analog channel A provided in this television standard and supplies signals having 1250 l., 50 Hz, 2:1, 1440 p./l., line period = 32 microseconds, that is pictures, the decoding device 10 has utilized the signals conveyed by the digital assistance channel, namely: the displacement vectors per picture block and the decision signals. As will be described in greater detail hereinafter the temporal rate converter device 20 also receives these "displacement vectors" signals and these decision signals as well as the "high definition" signals from the output of the decoder device 10.

This temporal rate converter arrangement 20 includes first of all in the example described a line period changing circuit 100 which here is simply assembled from two field memories which operate alternately (one in the write mode at the frequency of 54 MHz and the other one in the read mode at the frequency of 108 MHz, the basic frequency of 27 MHz being available in the decoder device 10) and a change-over switch which is controlled at a frequency of 50 Hz to ensure this alternating operation. Thus, from the high definition signals having a line period of 32 microseconds, similar signals are obtained but whose line period has a duration of 16 microseconds.

The line period changing circuit 100 is followed by a series arrangement of three field memories 70, 80, 90 which each produce a delay of 10 milliseconds. As the input signals include a field, in turns odd and even, every 20 milliseconds, it will be obvious that the presence of three memories 70 to 90 renders it possible to have these two fields available in the following manner: the first odd field is available simultaneously on the output line 81 of the memory 80 and, after a delay of 10 ms, on the output line 71 of the memory 70, while the second field, even, subsequent to it is simultaneously available on the output line 101 of the line period changing circuit 100 and, after a delay of 10 ms, on the output line 91 of the memory 90. These four output signals, of the memories 70, 80, 90 and of the circuit 100 denoted $I_1, I_2, I_3, I_4$, respectively, are each shifted through 10 ms relative to the next signal, and will be used in a distinct manner as will be described hereinafter.

However, first of all the structure of the decoder, and also the structure of the corresponding encoder will be recalled to mind. This encoder comprises three parallel arranged processing branches which each at their common input receive the high definition pictures having 1250 l., 50 Hz, 2:1, 1440 p./l., which for their processing are divided into sequentially scanned blocks. Each branch is characterized by the displacement or motion velocity range which it must take into account, and the so-called 80 millisecond branch will be singled out, to which, in the present case a field frequency of 12.5 Hz and a motion range from 0 to 0.5 picture element (or pixel) per 40 ms period correspond, the so-called 40 ms branch to which a field frequency of 25 Hz and a motion range from 0.5 to 12 pixels per 40 ms period correspond, and the so-called 20 millisecond branch to which a field frequency of 50 Hz and the motion range of more than 12 pixels per 40 ms period correspond. At the output of these three branches a routing circuit selects a sequence of picture elements or samples whose content, corresponding to each block of the original picture, is obtained from one of the three branches, depending on the value of a decision signal outPutted by a decision-making circuit which in its turn is preceded by a motion range estimating circuit.

The output of the routing circuit is then supplied for transmission via the analog channel to convey the different analog components of the television signal. Associated with this analog channel is the auxiliary channel, denoted the digital assistance channel, or DATV channel, which transmits the complementary information components such as the displacement vector D between pictures, decision signals DEC, denoted digital assistance data or signals.

The decoder which on the one hand receives the signal transmitted via the analog channel and on the other hand the digital assistance data (displacement vectors D, decision signals DEC) transmitted by the DATV channel, comprises also three parallel branches, receiving the transmitted pictures and whose outputs are applied to a routing circuit. This routing circuit receives the decision signal transmitted via the DATV channel and, as on transmission, selects the appropriate outputs of the 20 ms, 40 ms, 80 ms branches, depending on the motion information received. This output of the decoder is the 1250 line, 50 Hz, 2:1, 1440 p./l. picture, having a line period =32 microseconds, which is conveyed to the Line period changing circuit 100 of the arrangement according to the present invention.

According to the invention, the temporal rate converter arrangement 20 also includes, associated with the elements 70 to 100, three processing paths of the signals $I_1$ to $I_4$ present on the lines 71 to 101. Each of these three paths ensures a processing operation corresponding to the three respective stationary branches, which can be compensated and are not compensated, or 80, 40, and 20 millisecond branches.

The first path, which corresponds to the so-called stationary or 80 ms branch, is simply provided with a change-over switch 110, which is controlled at a frequency of 100 Hz to take successively the signals $I_3, I_4, I_1, I_2$ in this sequence. This signal taking operation which is effected every 10 milliseconds is schematically shown in the Table of FIG. 2, in which the fields A, B, C, D, E, etc. . . . are shown at the abscissa, which appear successively on the lines 71 to 101, to constitute the signal $I_1$ to $I_4$ and at the ordinate the sequence of operation of the change-over switch 110. The successive signals taken by the change-over switch 110 are surrounded by a circle. The sequence of high definition 50 Hz fields is as follows: A, B, C, D, E, etc. . . . having a period of 20 milliseconds. A scrutiny of FIG. 2 shows that the succession of signals at the output of the change-over switch 110 which is controlled at a frequency of 100 Hz is as follows: A B A B C D C D E F E, etc. . . . , having a period of 10 milliseconds. Thus, the field frequency has been doubled, by field repetition, which eliminates unwanted jitter.

The second path, which corresponds to the so-called compensatable or 40 ms branch, comprises a series arrangement of an adder 210 and a change-over switch 220, which is also controlled at a frequency of 100 Hz to take in turns either the output of the adder 210 or the signal $I_3$. The adder 210 renders it possible to take the halfsum of the signals $I_2$ and $I_4$ (which correspond to two successive fields, odd and even, of the high definition 50 Hz signal) taking account of the displacement produced from one signal to the other. This displacement is known thanks to the displacement vector determined on transmission, in the coding device, and transmitted via the digital assistance channel DATV. This displacement vector is consequently applied to the adder 210.

The output or signal taking operation effected every 10 milliseconds by the change-over switch 220 is shown schematically in the Table of FIG. 3 which shows the same fields A B C D E, etc. . . . which successively constitute the signals $I_1, I_2, I_3, I_4$ at different instants at which they are taken, at the rate of the change-over switch. The signals taken successively by the change-over switch 220 are, alternately, the signal $I_3$ surrounded by a circle, and the motion compensated halfsum $I_2+I_4$ which is shown in a distinct manner in FIG. 3. The sequence of fields at 50 Hz was A B C D E, etc. . . . , having the period of 20 milliseconds; a scrutiny of FIG. 3 shows that the sequence of output signals of the change-over switch 220 is now as follows:

A (A+8)/2 B (B+C)/2 C (C+2)/2 D (D+E}/2 etc . . . , the signals following each other in this sequence at each period of 10 milliseconds. Thus, a doubling of the field frequency has of been realized, by taking the halt-sum with motion compensation.

The third path, corresponding to the so-called non-compensated or 20 ms branch, comprises a series arrangement of a filter and a change-over switch 320, which is also controlled at the frequency of 100 Hz to successively take either the outPut of the filter, oz the signal $I_3$. In the embodiment shown in FIG. 1, the filter is, for example, a vertical filter 310 by means of which it is possible to generate by a simple vertical interpolation between lines, a new field A, for A, B for B, C, for C, etc . . . The succession of 50 Hz fields was A B C D E, etc. . . . , the field B being shifted vertically through half a line interval relative to A, the field C being shifted vertically through a half line interval relative to B and consequently superposable on A, and so on. It follows that by the interpolation principle chosen A being also shifted, through half a line interval relative to A, and similarly for C relative to C, D, relative to D, the sequence of 100 Hz fields cannot be of the type A A′ B B′ C C′ D D′.

One can rather, as is shown in FIG. 4a, take successively the signal sequence A A′ B′ B C C′ D′ D, etc. . . . in which each field is now clearly shifted vertically through half a line interval relative to the preceding field. The change-over switch 320 of FIG. 1 consequently takes successively, for example;

at the instant 20 ms, the field A = $I_1$ of the line,
at the instant 30 ms the filtered field A from the output of the filter 310 (the filtering time being clearly less than 10 ms, and the field A having been present at the preceding switching instant 20 ms on the input line 81 of the filter 310, this field A. can actually be available at the instant 30 ms),
at the instant 40 ms the filtered field B′ from the output of the filter 310 (this field B′ is actually available for the same reason as the preceding field A′),
at the instant 50 ms the field B = $I_1$ on the line 71, —at the instant 60 ms the field C = $I_1$ on this same line 71, etc. . . . in a periodical manner, the relevant periodicity having a duration of 40 milliseconds. The desired field frequency doubling has again been obtained.

The temporal rate converting arrangement 20 finally includes a routing circuit 400, which depending on the decision signal DEC received after transmission via the DATV channel, directs the output of one of the change-over switches 110, 220 or 320 towards the output of the arrangement 20. The output signal thus formed is a signal having 1250 l., 100 Hz, 2:1 1440 p./l., from which any jitter is absent from now on.

Figure 5:
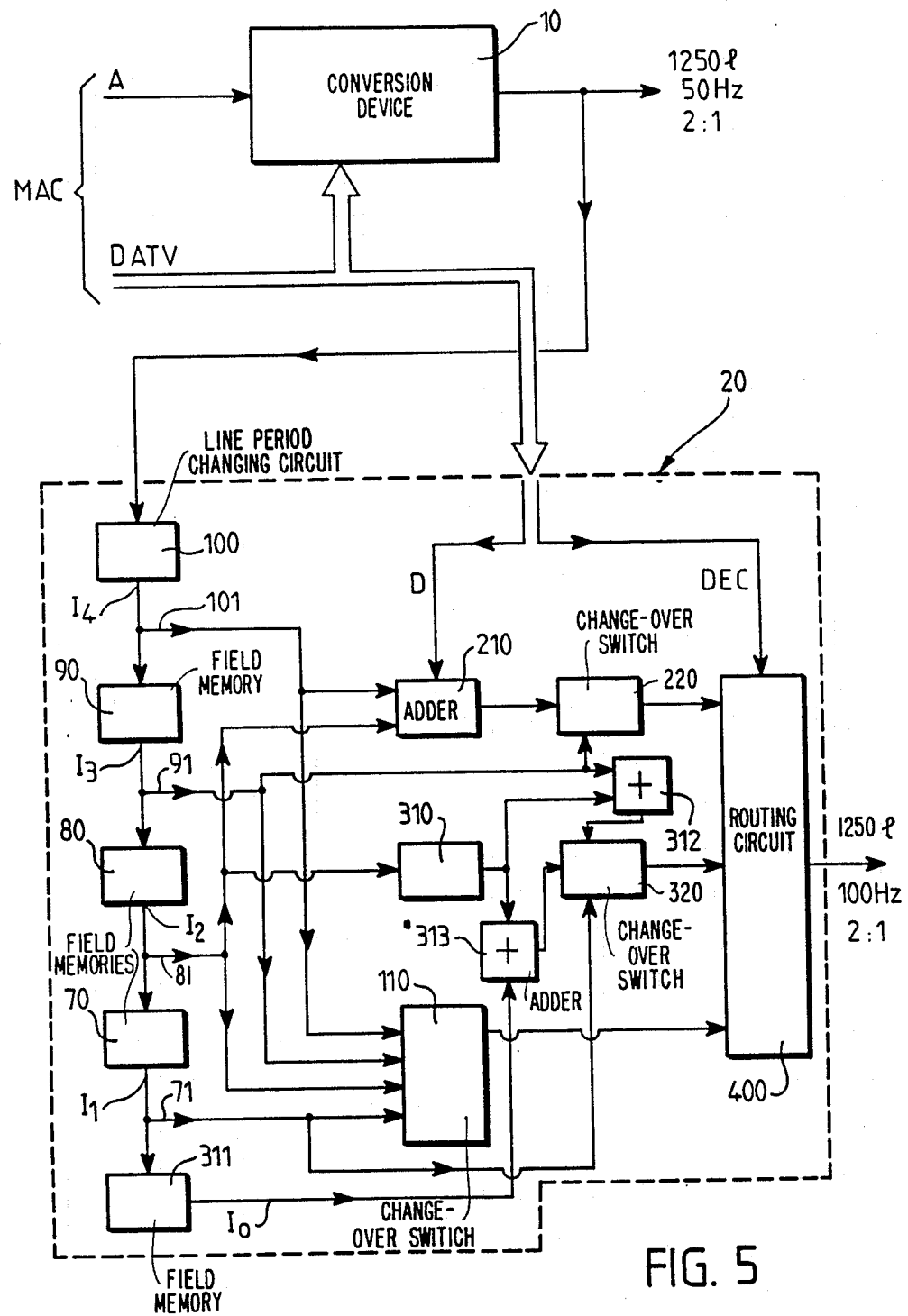
FIG. 5 shows a further embodiment of the decoder, including a variant of the embodiment of the temporal rate conversion device in accordance with the invention.

It should be understood that the present invention is not limited to the embodiment described above and shown in the drawing, from which variations can be proposed without departing from the scope of the invention. FIG. 5 shows, for example, a variant of the embodiment of the decoder in accordance with the invention, in which the above-described vertical filtering operation is completed by a temporal filtering operation which will render it possible to insert between the fields A and B, fields composed in a more complex way. A sequence of 100 Hz fields of the type A (2A′+B)/3 (A+2B′)/3 B C (2C′+D)/3 (2C+2D′)/3D E (2E′+F)/3, etc. . . . can e.g. be constituted. The filter then associates with the vertical filter 310, to obtain the above example, a fourth field memory 311, an adder circuit 312 for adding together the output of the filter 310 and the signal) $I_3$, and an adder circuit 313 for adding together this output of the filter 310 and the output, denoted $I_0$, of the fourth field memory 311.

As in the preceding cases, FIG. 4b illustrates in what manner the new set of signals A (2A′+B)/3 (A+2B′)/3 B, etc. . . . is formed at the rate of 100 Hz. This time the change-over switch 320 successively takes:

the field A = $I_1$ at the instant 30 ms;
the output of the adder circuit 312 at the instant 40 ms (this adder circuit is not only a simple adder but, more accurately, receives A., which is the filtered output of the vertical filter 310, and B = $I_3$, and supplies the signal (2A′+B)/3),
the output of the adder circuit 313 at the instant 50 ms (similarly this added circuit is provided to receive B′, which is the filtered output of the filter 310, and A = $I_0$, and supplies the signal (A+2B′)/3)),
the field B = $I_1$ at the instant 60 ms;
the field C = $I_1$ at the instant 70 ms, etc. . . . Thus the field frequency has again been doubled.

We claim:

1. A method of converting the temporal rate of high definition television pictures, comprising the following steps:
   (a) dividing the line period of the sequence of original pictures by two;
   (b) storing the consecutive field forming said pictures, for a working period corresponding to a period of the said pictures and at the rate corresponding to the temporal rate to be obtained after conversion;
   (c) parallel processing of said stored fields by simple field repetition, by taking motion-compensated half-sums, and by filtering;
   (d) selecting in dependence on additional information components, one of the three field sequences thus processed.

2. A method of converting the temporal rate as claimed in claim 1, wherein said selection is effected by utilizing the digital assistance signals provided in the HD-MAC standard.

3. Arrangement for converting the temporal rate of high definition pictures, comprising:
   (a) a line period changing circuit intended to divide by two the duration of the lines of the sequence pictures;
   (b) arranged in series with said circuit, three field memories for each producing a delay equal to half the line period of the sequence of images, the output signals of said memories and said circuit, present on corresponding connections, being denoted as is customary by $I_1$, $I_2$, $I_3$, $I_4$;
   (c) a first change-over switch coupled to receive a control signal for operating at a frequency which is twice the frequency of the sequence of images and being coupled to receive in parallel each of the signals $I_1$ to $I_4$ to supply sequentially, at its operating rate, the respective signals $I_3$, $I_4$, $I_1$, $I_2$;
   (d) a series arrangement of an adder for taking the halfsum sum of the signals $I_2$ and $I_4$, said adder having a third input for receiving a motion information component to compensate movement of one signal to the other, and a second change-over switch being coupled to receive a control signal for operating at a frequency which is twice the frequency of the sequence of images, and further being coupled to receive in parallel said motion-compensated half-sum and the signal $I_3$ to supply sequentially, at its operating rate, this half-sum of this signal $I_3$;
   (e) a series-arrangement of a filter and a third change-over switch being coupled to receive a control signal for operating at said frequency of double the frequency of the sequence of pictures, and further being coupled to receive in parallel the output signal of said filter and the signal $I_3$ to supply sequentially, at its operating for a working rate, this output or this signal $I_3$.

4. A high definition television picture decoder comprising an arrangement for decoding said pictures, characterized in that it also comprises a temporal rate converter arrangement as claimed in claim 3.

5. A decoder as claimed in claim 4, wherein said temporal rate converter arrangement is integrable in a common manner with the decoder.

6. Arrangement as claimed in claim 3, wherein the filter comprises a spatial filter for interpolating between two fields.

7. A high definition television picture decoder comprising an arrangement for decoding said pictures, characterized in that it also comprises a temporal rate converter arrangement as claimed in claim 6.

8. A decoder as claimed in claim 7, wherein said temporal rate converter arrangement is integrable in a common manner with the decoder.

9. An arrangement as claimed in claim 6, wherein the filter also comprises a temporal filter.

10. A high definition television picture decoder comprising an arrangement for decoding said pictures, characterized in that it also comprises a temporal rate converter arrangement as claimed in claim 9.

11. A decoder as claimed in claim 10, wherein aid temporal rate converter arrangement is integrable in a common manner with the decoder.

12. An arrangement as claimed in claim 3, wherein the line period changing circuit comprises two parallel-arranged field memories to function alternately one in the write mode at a predetermined frequency and the other in the read mode at double the frequency, and followed by a fourth change-over switch, which is coupled to receive a control signal for operating at the frequency of 50 Hz to alternately select the output of one or the other of said memories.

13. A high definition television picture decoder comprising an arrangement for decoding said pictures, characterized in that it also comprises a temporal rate converter arrangement as claimed in claim 12.

14. A decoder as claimed in claim 13, wherein said temporal rate converter arrangement is integrable in a common manner with the decoder.

15. An arrangement as claimed in claim 12, wherein the filter comprises a spatial filter for interpolating between two fields.

16. An arrangement as claimed in claim 15, wherein the filter also comprises a temporal filter.

17. A high definition television picture decoder comprising an arrangement for decoding said pictures, characterized in that it also comprises a temporal rate converter arrangement as claimed in claim 15.

18. A decoder as claimed in claim 14, wherein said temporal rate converter arrangement is integrable in a common manner with the decoder.

* * * * *